Feb. 3, 1925.  1,525,055

F. H. VAN HOUTEN

DOUBLE CATCHER

Filed Aug. 18, 1923

Inventor
F. H. Van Houten
By Church & Church
His Attorneys

Patented Feb. 3, 1925.

1,525,055

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUBLE CATCHER.

Application filed August 18, 1923. Serial No. 658,142.

*To all whom it may concern:*

Be it known that I, FRANK H. VAN HOUTEN, a citizen of the United States, residing at Beacon, in the county of Dutchess and State of New York, have invented certain new and useful Improvements in Double Catchers; and I do hereby declare the following to be a full, clear, and exact description of the same, reference being had to the accompanying drawing, forming part of this specification.

This invention relates to rounding-up machines for making spherical balls of dough and has for its principal object the provision of an attachment to be used in connection with a rounding-up machine to prevent passage from the rounding machine to the proofer and molding machines of balls of dough of double size.

A further object of the present invention is to provide a fence for a spiral molding machine provided with two outlets one at the end of the fence and the other in proximity thereto, the intermediate outlet having an adjustable gate which will readily permit exit of a ball of dough of the proper size but which will prevent exit of a double, forcing the latter to go to the end of the fence and be discharged through the terminal outlet.

In all rounding machines where the pieces of dough follow one after the other through the machine it not infrequently happens that two pieces of dough come in contact with one another and are rounded together by the machine into a single ball, these balls being technically known to the trade as "doubles". Heretofore no attempt has been made to get rid of these doubles automatically while the dough is passing the rounding-up machine and consequently they pass through the rounder and through the proofer and cause trouble when they reach the molding machine unless they are manually removed from the conveyor at some point before reaching the molder. Since the doubles are of twice the weight and volume of a proper sized ball, they are of materially larger diameter and could readily be eliminated by making the exit hole so small that a double would not pass, but the difficulty in general is that the velocity or speed of movement is a very material factor and if not properly provided for would render the double catcher inoperative. By providing two outlets, which may be of the same size, and by restricting the vertical clearance to the intermediate outlet, it is possible to eliminate all doubles irrespective of the velocity of the moving balls and in this way avoid all difficulty in the molding machine.

In the drawings,—

Figure 1:
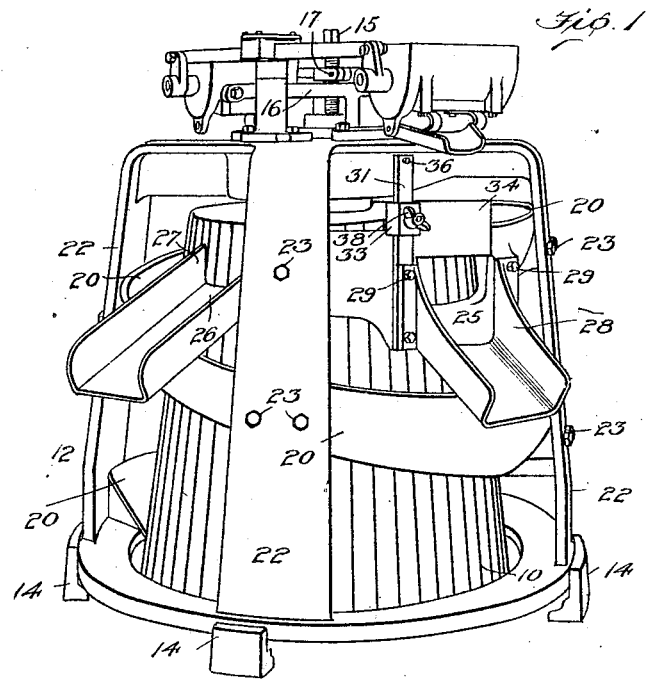
Figure 1 is a perspective view of a rounding-up machine embodying the present invention.
Figure 2:
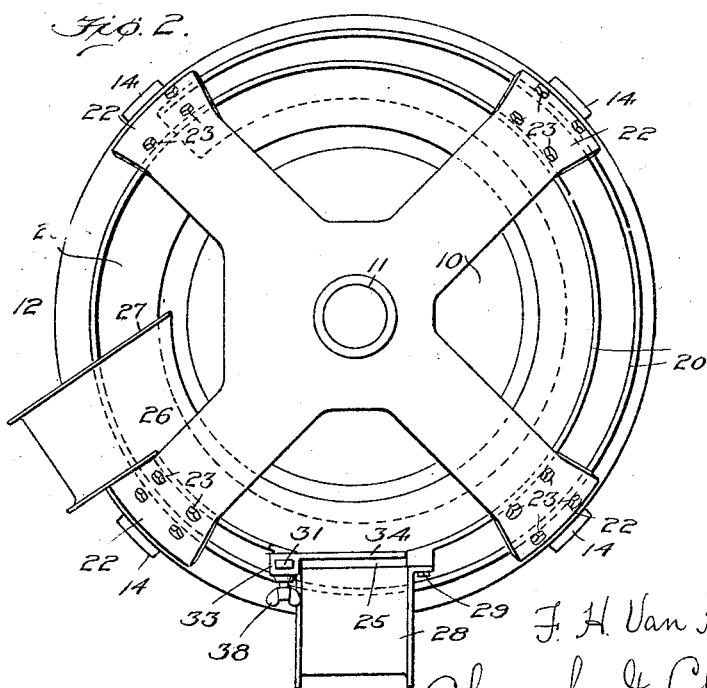
Fig. 2 is a top plan view of the two outlets, the dusting machinery being omitted for the sake of clearness.

The drum 10 revolves about a stationary post 11 firmly secured to the base of the machine, this post serving to support the fence 12 which is movable axially of the post being guided by a plurality of curved lugs 14 on the base and being held in adjustable position by means of the screw 15 threaded through the yoke 16 on the upper base of the molding fence frame, a set screw 17 being provided to lock the frame in proper relation to the conical drum. It will be noted that since the frame is held against lateral movement by the four or more lugs on the base of the machine the movement of the molding fence is such as to maintain it at all times coaxial with the molding drum and hence any desired clearance may be obtained.

The molding fence 20 is preferably a spiral guide which may be a single piece but is preferably a number of separate castings bolted to the four standards 22 of the frame as indicated at 23. Near the top of the drum the fence has a main outlet 25 and further on a secondary or terminal outlet 26 is provided, the farther edge 27 of which is in close proximity to the surface of the drum to prevent the passage past the outlet of any particles of dough. The main outlet 25 is preferably provided with a casting such as 28 bolted thereto as at 29 and furnishing an outlet chute through which the balls of proper size are discharged.

A standard 31 is secured to the molding fence preferably at the point between the outlet 25 and the chute 28 forming a guide for the sleeve 33 of the adjustable gate 34 which has a vertical movement substantially in alinement with the vertical wall of the fence and is movable up and down on the standard 31 except as limited by contact with the chute 28 at the bottom and with the stop pin 36 at the top of the standard. The gate is adjustable in order that any size balls may be made on the rounding-up machine, the gate 34 being moved to the desired height and being secured in such adjusted position by means of a set screw having a wing nut handle 38.

The operation of the device is believed to be clear from the foregoing description. The pieces of dough are delivered in any desired manner, as for example by a conveyor, near the lower end of the spiral molding fence opposite to the outlet 28; these pieces land against the surface of the drum near the bottom and by virtue of the rotation of the drum on the main post are rolled along the fence by contact with the drum and are formed into more or less perfect spheres as they rise over the surface of the drum due to such rotation.

Balls of the proper size pass readily through the outlet 25 but should a double be formed its diameter is such that it engages the lower edge of the gate 34 and is therefore rolled past the outlet 25 and is conducted to the terminal outlet 26 and is discharged at this point into a container or to a conveyor as may be desired. The molding fence and its frame in addition to being movable coaxially of the drum and post is also movable angularly about its own axis so that the chute 28 may discharge in any given direction.

What I claim is:

1. In a dough machine, a drum, a molding fence coaxial with the drum and having a plurality of outlets, and adjustable means for limiting the size of an intermediate outlet.

2. In a dough machine, a cone-shaped drum, a spiral molding fence coaxial with said drum and having a plurality of delivery exits, means for altering the clearance between the fence and the drum, and means for limiting the clearance of delivery exit nearest the entrance to said fence.

3. In a dough machine, a post, a drum rotatably mounted on said post, a molding fence surrounding said drum, a plurality of delivery exits at the top of said fence one of which is the main exit and an adjustable gate for said main exit for limiting the clearance thereof to prevent exit therefrom of an oversized dough ball.

4. In a dough machine, a molding fence having an intermediate and a terminal exit and an adjustable gate controlling the amount of clearance through said intermediate exit.

5. In a dough machine, a drum, a fence surrounding said drum, a plurality of exits in said fence, a standard in proximity to an intermediate exit, and a gate adjustably mounted on said standard.

6. In a dough machine, a spiral molding fence having an inlet opening and an outlet opening diametrically opposite each other and at a different height, a terminal outlet opening above said outlet opening, and an adjustable gate substantially in line with the outer wall of the molding fence restricting the size of the exit opening of the first mentioned outlet opening.

FRANK H. VAN HOUTEN.